UNITED STATES PATENT OFFICE.

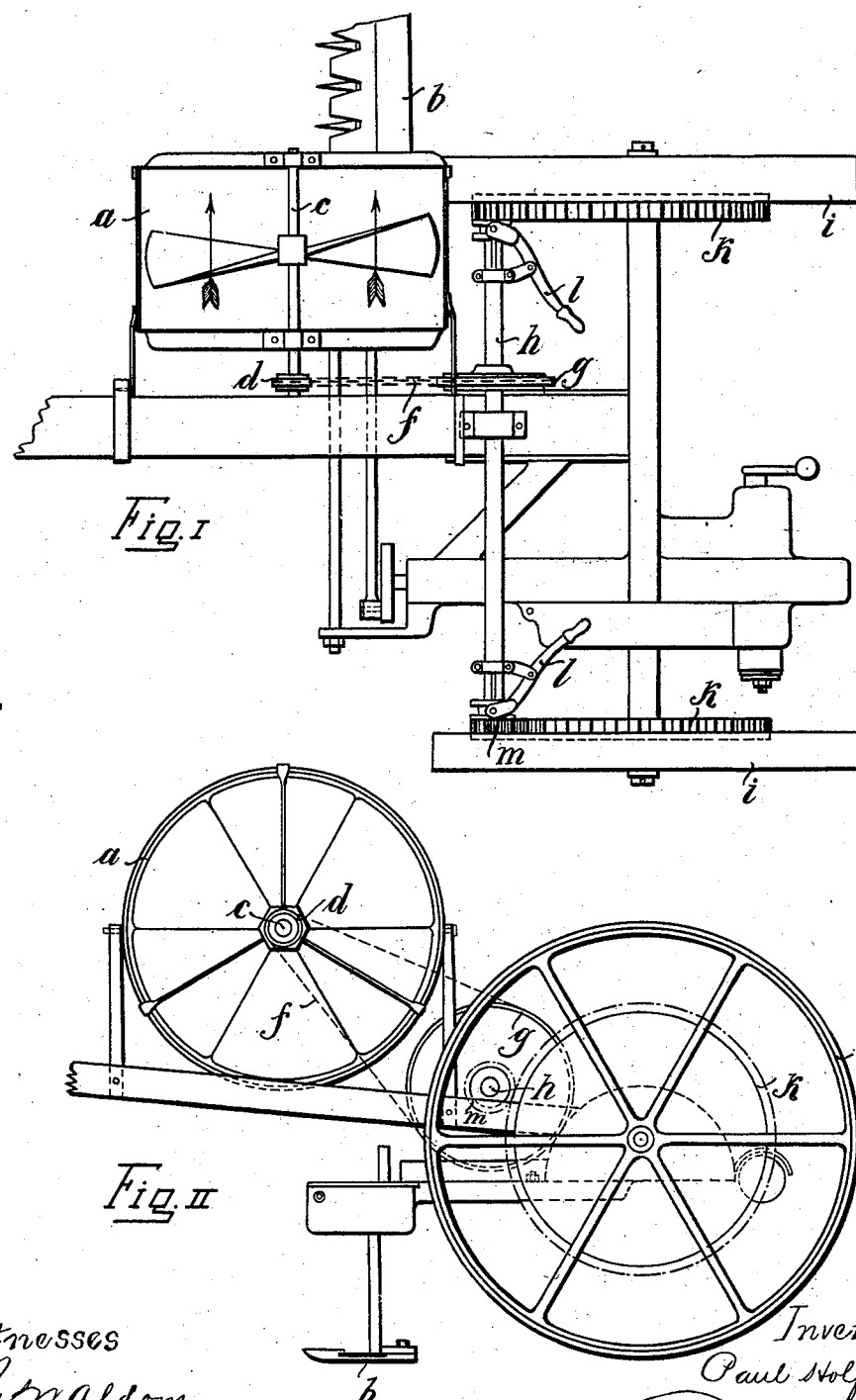

PAUL HOLFERT, OF SEITENHAIN, LIEBSTADT, GERMANY.

GRASS-MOWING MACHINE.

SPECIFICATION forming part of Letters Patent No. 718,458, dated January 13, 1903.

Application filed May 10, 1902. Serial No. 106,796. (No model.)

*To all whom it may concern:*

Be it known that I, PAUL HOLFERT, landlord, a subject of the King of Saxony, Germany, and a resident of Seitenhain, Liebstadt, in the Kingdom of Saxony, Germany, have invented new and useful Improvements in Grass-Mowing Machines, of which the following is a specification.

This invention relates to a grass-mowing machine having an air-blower for the purpose to enable the peasant to mow also with the same machine corn from four sides of the field on gentle breeze and from three or two sides on fair or high wind. The blower arranged upon the grass-mowing machine generates a heavy air-current, which causes the corn standing immediately before the cutters to incline, so that the falling halms place themselves closely and smoothly on each other, whereby the work of setting confusedly-lying halms in order before binding them may be dispensed with. By the fact that the halms fall smoothly and evenly on the offset they can be better and more conveniently taken off from the latter. Also the danger of hurting the hands by the cutters is diminished.

In the accompanying drawings, Figure 1 shows a plan view, and Fig. 2 a side elevation, of the machine.

The blower $a$ is arranged above the cutters $b$, preferably in such a manner that it may be displaced or removed. The axle $c$ of the wings is provided with a small chain-wheel $d$, which is rotated by a chain $f$ of a chain-wheel $g$, fixed on a shaft $h$. This shaft $h$ is rotated from the wheels $i$ by gearings $k$ and $m$, which may be engaged or disengaged by clutch devices $l$.

In consequence of the revolution of the wings of the blower an air-current in the direction of the arrows, Fig. 1, is produced. This air-current inclines the grain sidewise of the running direction of the machine, so that the grain after being cut off falls uniformly and smoothly behind the cutters. The grain may thus be conveniently removed for binding. Should grass be mowed with this machine, the blower may be disconnected by disengaging the gears $k\ m$, or the blower may be removed.

What I claim as my invention, and desire to secure by Letters Patent, is—

1. In a grass-mowing machine the combination with the cutter-bar of an air-blower $a$ arranged to discharge a blast of air longitudinally of said cutter-bar for the purpose specified with means of engaging and disengaging same.

2. In combination, with the cutter-bar of a mowing-machine, a fan and means for driving the same, said fan discharging a blast of air in a direction longitudinally of the cutter-bar whereby the grain will be inclined laterally in respect to the direction of movement of the machine, substantially as described.

In witness whereof I have hereunto set my hand in presence of two witnesses.

PAUL HOLFERT.

Witnesses:
  HERNANDO DE SOTO,
  PAUL ARRAS.